United States Patent
Kim et al.

(10) Patent No.: US 11,842,631 B2
(45) Date of Patent: Dec. 12, 2023

(54) COMMUNICATION DEVICE, CONTROL METHOD THEREOF AND COMMUNICATION SYSTEM INCLUDING THE SAME

(71) Applicant: LG Electronics Inc., Seoul (KR)

(72) Inventors: Eunjin Kim, Seoul (KR); Eunsong Jang, Seoul (KR); Jeongeun Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 341 days.

(21) Appl. No.: 16/692,894

(22) Filed: Nov. 22, 2019

(65) Prior Publication Data

US 2020/0168080 A1  May 28, 2020

(30) Foreign Application Priority Data

Nov. 23, 2018 (WO) ................ PCT/KR2018/014505

(51) Int. Cl.
| | | |
|---|---|---|
| *G08G 1/01* | (2006.01) | |
| *H04W 4/021* | (2018.01) | |
| *H04W 4/029* | (2018.01) | |
| *G08G 1/0967* | (2006.01) | |
| *H04W 4/46* | (2018.01) | |
| *B60W 10/04* | (2006.01) | |
| *B60W 10/18* | (2012.01) | |

(Continued)

(52) U.S. Cl.
CPC .......... *G08G 1/0112* (2013.01); *B60W 10/04* (2013.01); *B60W 10/18* (2013.01); *B60W 10/20* (2013.01); *B60W 30/18* (2013.01); *G08G 1/096725* (2013.01); *G08G 1/096791* (2013.01); *H04W 4/022* (2013.01); *H04W 4/029* (2018.02); *H04W 4/46* (2018.02); *B60W 2710/18* (2013.01); *B60W 2710/20* (2013.01); *B60W 2720/106* (2013.01); *B60W 2756/10* (2020.02)

(58) Field of Classification Search
CPC .......... G08G 1/0112; G08G 1/096725; G08G 1/096791; G08G 1/096783; G08G 1/164; H04W 4/022; H04W 4/029; H04W 4/46; H04W 4/024; B60W 10/04; B60W 10/18; B60W 10/20; B60W 30/18; B60W 2756/10; B60W 2710/18; B60W 2710/20; B60W 2720/106
USPC ...................................... 701/301
See application file for complete search history.

(56) References Cited

U.S. PATENT DOCUMENTS

| | | | | |
|---|---|---|---|---|
| 10,019,901 | B1 * | 7/2018 | Fields | ................ G06K 9/00805 |
| 2007/0159354 | A1 * | 7/2007 | Rosenberg | ........... G08G 1/0965 |
| | | | | 340/902 |

(Continued)

FOREIGN PATENT DOCUMENTS

| | | |
|---|---|---|
| KR | 20090061782 | 6/2009 |
| KR | 20130007754 | 1/2013 |

(Continued)

*Primary Examiner* — B M M Hannan
(74) *Attorney, Agent, or Firm* — Fish & Richardson P.C.

(57) ABSTRACT

A communication device includes: a communication unit receiving position information of each vehicle from vehicles located in a predetermined area; and a processor setting first and second geofences for the predetermined area, and controlling the communication unit to transmit a warning message related to an event to one or more vehicles located in the second geofence in response to the event occurring in the first geofence.

19 Claims, 8 Drawing Sheets

(51) Int. Cl.
    *B60W 10/20*    (2006.01)
    *B60W 30/18*    (2012.01)

(56) References Cited

U.S. PATENT DOCUMENTS

| | | | |
|---|---|---|---|
| 2009/0009321 A1* | 1/2009 | McClellan | H04W 4/021 340/539.13 |
| 2012/0044063 A1* | 2/2012 | McClellan | H04W 4/027 340/441 |
| 2012/0086583 A1 | 4/2012 | Morrison | |
| 2013/0015983 A1* | 1/2013 | Goudy | G08G 1/096783 340/905 |
| 2013/0018572 A1* | 1/2013 | Jang | G08G 1/164 701/119 |
| 2016/0167579 A1* | 6/2016 | Hwang | G08G 1/163 340/435 |
| 2017/0039666 A1* | 2/2017 | Kuersten | G06Q 30/0251 |
| 2018/0005523 A1* | 1/2018 | Cahan | G08G 1/087 |
| 2018/0225898 A1* | 8/2018 | Kirkland | G07C 9/28 |
| 2019/0213881 A1* | 7/2019 | Bender | B60W 50/14 |
| 2019/0253835 A1* | 8/2019 | Jones | G08G 5/0013 |
| 2020/0258018 A1* | 8/2020 | Brady | H04W 4/40 |

FOREIGN PATENT DOCUMENTS

| | | | |
|---|---|---|---|
| KR | 101512935 | 4/2015 | |
| KR | 20160071161 | 6/2016 | |
| WO | WO-2017147677 A1 * | 9/2017 | B60K 26/02 |

\* cited by examiner

COMMUNICATION DEVICE, CONTROL METHOD THEREOF AND COMMUNICATION SYSTEM INCLUDING THE SAME

CROSS-REFERENCE TO RELATED APPLICATION

Pursuant to 35 U.S.C. § 119(a), this application claims the benefit of earlier filing date and right of priority to International Application No. PCT/KR2018/014505, filed on Nov. 23, 2018, the contents of which is incorporated by reference herein in its entirety.

BACKGROUND OF THE DISCLOSURE

1. Field of the Disclosure

The present disclosure relates to a communication device capable of performing communication with an electric component provided in a vehicle and/or the vehicle, a control method thereof, and a communication system including the same.

2. Background of the Disclosure

A vehicle refers to means of transporting people or goods by using kinetic energy. Representative examples of vehicles include automobiles and motorcycles.

For safety and convenience of a user who uses the vehicle, various sensors and devices are provided in the vehicle, and functions of the vehicle are diversified.

The functions of the vehicle may be divided into a convenience function for promoting driver's convenience, and a safety function for enhancing safety of the driver and/or pedestrians.

First, the convenience function has a development motive associated with the driver's convenience, such as providing infotainment (information+entertainment) to the vehicle, supporting a partially autonomous driving function, or helping the driver ensuring a field of vision at night or at a blind spot. For example, the convenience functions may include various functions, such as an active cruise control (ACC), a smart parking assist system (SPAS), a night vision (NV), a head up display (HUD), an around view monitor (AVM), an adaptive headlight system (AHS), and the like.

The safety function is a technique of ensuring safeties of the driver and/or pedestrians, and may include various functions, such as a lane departure warning system (LDWS), a lane keeping assist system (LKAS), an autonomous emergency braking (AEB), and the like.

The introduction of advanced driver assistance system (ADAS) has increased safety and convenience of passengers. However, it takes a lot of time and money to apply the ADAS to all vehicles.

Vehicles without the ADAS may not be guaranteed safety in various environments such as intersections and access roads, and there is a problem that the technology may not be utilized even though the necessity for safety of operation is increasing gradually.

Further, as a convenience function and a safety function are applied to a vehicle, the amount of data transmitted and received between an external device located outside the vehicle and an internal device mounted in the vehicle is rapidly increasing. This is because the internal device transmits internal information generated by itself to a server, and the server transmits external information available to the internal device to the vehicle.

With the emergence of autonomous vehicles, 5th generation mobile communication (5G network) is being developed together. The 5th generation mobile communication is next generation communication technology following 4th generation LTE-Advance, and it predicts large-capacity data transmission such as ultra-high-quality image, 3D stereoscopic image, 360VR image (or 360-degree video) and hologram.

In the 5th generation mobile communication, latency, which means a time required for data to travel between a vehicle and a base station server, is expected to be about 10 times faster than the 4th generation mobile communication. When the autonomous vehicle uses the fifth generation mobile communication, a time for exchanging data is shortened so that a control speed for avoiding obstacles or other vehicles is increased and safety of autonomous driving is strengthened.

Due to the advantages of the 5th generation mobile communication, various vehicle related services that have not been possible have been developed.

SUMMARY OF THE DISCLOSURE

Therefore, an aspect of the detailed description is to solve the above-mentioned problems and other problems.

Another aspect of the present invention is to provide a communication device that may perform a safety function and a convenience function even in a vehicle not equipped with a separate advanced driver assistance system (ADAS).

The present invention relates to a communication device, a control method thereof, and a communication system including the same are provided.

A communication device according to an embodiment of the present invention includes: a communication unit receiving position information of each vehicle from vehicles located in a predetermined area; and a processor setting first and second geofences based on the predetermined area, and controlling the communication unit to transmit a warning message related to an event to one or more vehicles located in the second geofence in response to the event occurring in the first geofence.

According to an embodiment, the event may be that any one of the vehicles enters the first geofence, and the processor may control the communication unit to transmit the warning message guiding that the any one vehicle has entered the first geofence to the one or more vehicles located in the second geofence.

According to an embodiment, at least one of a position, a size, and a shape of the first and second geofences may be defined in different manners according to characteristics of a road located in the predetermined area.

According to an embodiment, the second geofence may include an area located outside a boundary of the first geofence.

According to an embodiment, the processor may variably set the second geofence according to an attribute of the any one of the vehicles entering the first geofence.

According to an embodiment, the processor may set the first and second geofences in response to receiving vehicle information satisfying a reference condition from any one of the vehicles located in the predetermined area.

According to an embodiment, at least one of the position, size, and shape of the first and second geofences may be variably set according to the vehicle information received from the any one of the vehicles.

According to an embodiment, the vehicle information received from any one of the vehicles may include an image photographed by any one of the vehicles, and when an object obstructing the running of the vehicle is searched from the image, the processor may set the first and second geofences based on the object.

According to an embodiment, the processor may set the any one vehicle as a reference point of at least one of the first and second geofences in response to receiving of vehicle information satisfying the reference condition from the any vehicle, and at least one of the first and second geofences may be changed as the any one vehicle moves.

According to an embodiment, when the event occurs, the processor may control the communication unit to transmit a first warning message to a first vehicle located in the first geofence and transmit a second warning to a second vehicle located in the second geofence, and the first warning message and the second warning message may include different information.

According to an embodiment, the first warning message may include a control command for causing the vehicle located in the first geofence to perform a predetermined function and the second warning message may include guidance information for guiding the first geofence.

According to an embodiment, the first warning message and the second warning message may be transmitted in different manners.

According to an embodiment, the second geofence may include a plurality of geofences that are differently defined according to a speed of each vehicle located in the predetermined area.

Further, according to the present invention, a control method of a communication device is provided. The communication method includes: setting first and second geofences based on an event occurring in a predetermined area; receiving location information of each vehicle from vehicles located in the predetermined area; and transmitting a warning message for guiding that any one vehicle has entered the first geofence to one or more vehicles located in the second geofence in response to the any one vehicle entering the first geofence.

According to an embodiment, the setting of the first and second geofences based on the event may include: receiving vehicle running information from any one of the vehicles in the predetermined area; and determining at least one of a position, a size and a shape of the first and second geofences based on the vehicle running information when the vehicle running information satisfies a reference condition, wherein at least one of the position, size and shape of the first and second geofences may be variably set according to the vehicle running information.

Further, according to the present invention, a communication system is provided. The communication system includes: a plurality of vehicles located in a predetermined area in which first and second geofences are set and generating position information indicating their position within the predetermined area; and a communication device searching for a location of each vehicle based on the position information of each vehicle, selecting one or more vehicles located in the second geofence in response to the occurrence of an event in the first geofence, and transmitting a warning message related to the event to the one or more selected vehicles.

According to an embodiment, when the event occurs, the communication device may transmit a first warning message to a first vehicle located in the first geofence and a second warning message to a second vehicle located in the second geofence, and the first warning message and the second warning message may include different information.

According to an embodiment, the second vehicle may automatically adjust at least one of a running speed and a running lane until the second vehicle enters the first geofence in response to the second warning message.

According to an embodiment, when an abnormality of a driver is detected, the first vehicle among the plurality of vehicles may transmit a vehicle message indicating the abnormality to the communication device, the server may set the first vehicle as a reference point of at least one of the first and second geofences in response to the vehicle message, and at least one of the first and second geofences may be varied according to movement of the first vehicle.

According to an embodiment, the communication device may set the first and second geofences in response to receiving of vehicle information satisfying a reference condition from any one of the vehicles located in the predetermined area, and at least one of the position, size, and shape of the first and second geofences may be variably set according to the vehicle information received from any one of the vehicles.

Effects of the electronic control device and the vehicle including the same according to the present invention will be described as follows.

According to the present invention, it is possible to set a variable geofence according to event occurrence of a road and characteristics and a situation of the road and customized information may be provided to the corresponding area in real time even though a vehicle does not have the ADAS function. The safety function and the convenience function similar to the ADAS can be provided even to a vehicle without the ADAS, and thus, driver safety and convenience may be increased.

Since the customized geofence is variably provided in a predetermined area, information may be accurately transmitted and unnecessary information may be prevented from being provided to a passenger in advance. That is, the information necessary for a driver may be provided through the vehicle at a correct time. Since the information related to the geofence is transmitted to the vehicle through an ultra-wideband/super-real-time transmission environment, the information may be quickly and accurately transferred.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

DETAILED DESCRIPTION OF THE DISCLOSURE

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present invention may be understood as a conception including cars, motorcycles and the like. Hereinafter, the vehicle will be described based on a car.

Figure 1:
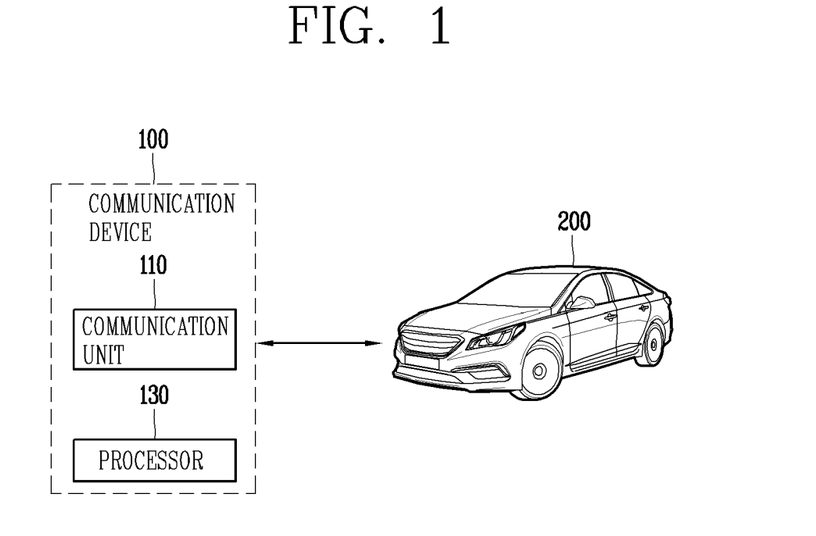
FIG. 1 is a block diagram for explaining a communication device and a communication system according to an embodiment of the present invention.

FIG. 1 is a block diagram of a communication device and a communication system in accordance with an embodiment of the present invention.

A communication system according to the present invention includes a communication device 100 and a vehicle 200.

The communication device includes a communication unit 110 and a processor 130.

The communication unit 110 is configured to perform communications with the vehicle 200. The communication unit 110 may receive various information provided from the vehicle 200 through an antenna and transmit information related to a geo-fence to the vehicle 200 under the control of the processor 130.

The communication unit 110 may perform communication with all devices capable of performing communication, such as a vehicle, a mobile terminal, a server, and another vehicle. This may be referred to as Vehicle to everything (V2X) communication. The V2X communication may be defined as a technology of exchanging or sharing information, such as traffic condition and the like, while communicating with a road infrastructure and other vehicles during driving.

The communication unit 110 may receive information related to the driving of the vehicle from most of devices provided in the vehicle 200. The information transmitted from the vehicle 200 to the display device is referred to as 'vehicle driving information (or vehicle travel information)'.

Vehicle driving information includes vehicle information and surrounding information related to the vehicle. Information related to the inside of the vehicle with respect to the frame of the vehicle 200 may be defined as the vehicle information, and information related to the outside of the vehicle may be defined as the surrounding information.

The vehicle information refers to information related to the vehicle itself. For example, the vehicle information may include a driving speed, a driving direction, an acceleration, an angular velocity, a location (GPS), a weight, a number of passengers in the vehicle, a braking force of the vehicle, a maximum braking force, air pressure of each wheel, a centrifugal force applied to the vehicle, a driving mode of the vehicle (autonomous driving mode or manual driving mode), a parking mode of the vehicle (autonomous parting mode, automatic parking mode, manual parking mode), whether or not a user is present in the vehicle, and information associated with the user. The surrounding information refers to information related to another object located within a predetermined range around the vehicle, and information related to the outside of the vehicle. The surrounding information of the vehicle may be a state of a road surface on which the vehicle is traveling (e.g., a frictional force), the weather, a distance from a front-side (rear-side) vehicle, a relative speed of a front-side (rear-side) vehicle, a curvature of a curve when a driving lane is the curve, information associated with an object existing in a reference region (predetermined region) based on the vehicle, whether or not an object enters (or leaves) the predetermined region, whether or not the user exists near the vehicle, information associated with the user (for example, whether or not the user is an authenticated user), and the like.

The surrounding information may include ambient brightness, temperature, a position of the sun, information related to nearby subject (a person, another vehicle, a sign, etc.), a type of a driving road surface, a landmark, line information, and driving lane information, and information required for an autonomous driving/autonomous parking/automatic parking/manual parking mode.

In addition, the surrounding information may further include a distance from an object existing around the vehicle to the vehicle 200, collision possibility, a type of an object, a parking space for the vehicle, an object for identifying the parking space (for example, a parking line, a string, another vehicle, a wall, etc.), and the like.

The vehicle driving information is not limited to the example described above and may include all information generated from the components provided in the vehicle 200.

The processor 130 may determine whether or not at least one of a plurality of preset conditions is satisfied, based on vehicle driving information received through the communication unit 110. According to a satisfied condition, the processor 130 may perform different controls.

In connection with the preset conditions, the processor 130 may detect an occurrence of an event in an electric device provided in the vehicle 200 and/or application, and determine whether the detected event meets a preset condition. At this time, the processor 130 may detect the occurrence of the event from information received through the communication unit 110.

The application is a concept including a widget, a home launcher, and the like, and refers to all types of programs that can be run on the vehicle 200. Accordingly, the application may be a program that performs a function of a web browser, a video playback, a message transmission/reception, a schedule management, or an application update.

Further, the application may include a forward collision warning (FCW), a blind spot detection (BSD), a lane departure warning (LDW), a pedestrian detection (PD) A Curve Speed Warning (CSW), and a turn-by-turn navigation (TBT).

For example, the event occurrence may be a missed call, presence of an application to be updated, a message arrival, start on, start off, autonomous driving on/off, pressing of an LCD awake key, an alarm, an incoming call, a missed notification, and the like.

As another example, the occurrence of the event may be a generation of an alert set in the advanced driver assistance system (ADAS), or an execution of a function set in the ADAS. For example, the occurrence of the event may be a occurrence of forward collision warning, an occurrence of a blind spot detection, an occurrence of lane departure warning, an occurrence of lane keeping assist warning, or an execution of autonomous emergency braking.

As another example, the occurrence of the event may also be a change from a forward gear to a reverse gear, an occurrence of an acceleration greater than a predetermined value, an occurrence of a deceleration greater than a predetermined value, a change of a power device from an internal combustion engine to a motor, or a change from the motor to the internal combustion engine.

In addition, even when various ECUs provided in the vehicle 200 perform specific functions, it may be determined as the occurrence of the event.

Although not shown, the communication device 100 may be provided with a memory.

The memory is configured to store data to support various functions of the communication device 100. The memory may be configured to store application programs (or applications) executed in the communication device 100, data or instructions for operations of the communication device 100, and the like. Some of these application programs may be downloaded from an external server via wireless communication. Other application programs may be installed within the communication device 100 at the time of manufacturing or shipping, which is typically the case for basic functions of the communication device 100 (for example, geo-fence setting, alarm related to geo-fence, etc.) In the meantime, the application programs which are stored in the memory and installed on the communication device 100 may be executed by the processor 130 to perform operations (or functions) for the communication device 100.

The processor 130 typically functions to control an overall operation of the communication device 100, in addition to the operations associated with the application programs. The processor 130 may provide or process information or functions appropriate for the vehicle 200 by processing signals, data, information and the like, which are input or output through the communication unit 110, or activating application programs stored in the memory.

Hereinafter, an operation performed by the communication device 100 will be described in detail.

Figure 2:
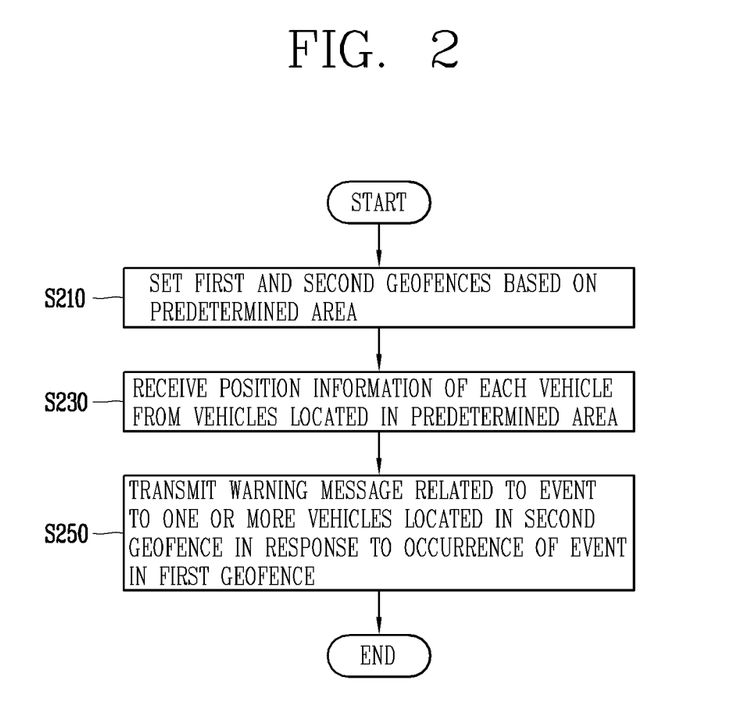
FIG. 2 is a flowchart for explaining a control method of a communication device according to an embodiment of the present invention.

FIG. 2 is a flowchart illustrating a method of controlling a communication device according to an embodiment of the present invention.

The processor 130 sets first and second geofences based on a predetermined area (S210).

Here, the geofence is a combination of geography and fence, which means a virtual boundary or zone based on an actual position. The geofence may be used when user's real-time position and entry information in combination with other assistive technologies such as Wi-Fi, a network of cellular data, and beacons. Once a mobile device containing position information enters a designated area, a specific predetermined operation, such as a text message, e-mail, and application notification may be performed depending on the conditions.

A developer may mark a position with latitude and longitude and add a radius to them to create an area surrounded by a fence in which the geofence operates. When the position is calculated in the mobile device and transmitted to the server, the server may calculate a space between the received user position and the geofence and transmit neighboring information to the device when the user enters the geofence area.

An application or platform in which the geofence has been set up may recognize a time the user or mobile device stays in this area, a position from which the user or the mobile device enters the area, a time point of departure, and a current position, and set an event such as sending nearby store shopping information or coupons according to the conditions. The user may also make a deeper real-time interaction with surrounding geographical features or objects.

The geofence may be the inside of a building or may be set to a large factory side, a circular zone with a radius, or a shape of a complex polygonal area.

The first geofence refers to an area where the processor 130 must determine whether to perform monitoring and output an alarm.

The second geofence refers to an area where an alarm must be received based on an event occurring in the first geofence.

The second geofence may include the first geofence and may be set to be larger than the first geofence. It is also possible to set the first and second geofences so as not to overlap each other.

At least one of the first and second geofences may be variably set according to event occurrence of a road and characteristics and situations of the road. A method for setting at least one of the first and second geofences will be described in detail with reference to other drawings.

The processor 130 receives position information of each vehicle from the vehicles located in the predetermined area (S230).

The processor 130 may track the position of each vehicle using the position information of each vehicle and may determine a position of each vehicle. For example, it may be determined whether the first vehicle is located in the first geofence or the second geofence.

Next, the processor 130 may send a warning message related to the event to one or more vehicles located in the second geofence in response to an event occurring in the first geofence (S250).

The processor 130 may monitor in real time whether or not an event occurs in the first geofence based on vehicle driving information received from the vehicles located in the predetermined area.

In response to an event occurring in the first geofence, a warning message associated with the event may be sent to one or more vehicles located in the second geofence.

For example, the event may be that at least one vehicle enters the first geofence. In this case, the processor 130 may control the communication unit 110 to transmit a warning message guiding that the at least one vehicle has entered the first geofence to one or more vehicles located in the second geofence.

The first geofence may be set in an area where accidents occur frequently or may be set in an access road such as an intersection or a ramp. The vehicle located in the second geofence may output notification information informing that the vehicle is entering the first geofence to an occupant of the vehicle in at least one of visual, auditory, and tactile manner in response to the warning message. Thus, the driver of the vehicle located in the second geofence may perform safe driving such as reducing a vehicle speed or strengthening a forward gaze before entering the first geofence.

A first warning message may be transmitted to a first vehicle located in the first geofence and a second warning message may be transmitted to a second vehicle located in the second geofence. Specifically, when the event occurs, the processor 130 may control the communication unit to transmit a first warning message to the first vehicle located in the first geofence and transmit a second warning message to the second vehicle located in the second geofence. At this time, different information may be included in the first warning message and the second warning message. For example, the first warning message may include a control command for causing the vehicle positioned in the first geofence to perform a predetermined function. The second warning message may include guidance information for guiding the first geofence.

In another example, the first warning message may include the guidance information and the second warning message may include the control command.

Here, the predetermined function may include at least one of a function of operating a brake such that a running speed of the vehicle is changed, an acceleration function of increasing an engine output, a decelerating function of decreasing the engine output, a running direction changing function of changing a running direction of the vehicle, and an emergency stop function.

In the case of a ramp section, the processor 130 may determine the best joining time point that each vehicle may join, taking into account positions and speeds of the vehicles located in the first and second geofences. It is possible to include a joining time point in the second warning message and transmit the message to each vehicle so that each vehicle joins the lamp section at the joining time point assigned to each vehicle.

The first and second warning messages may be transmitted in different manners.

For example, the first warning message may be transmitted to the vehicle located in the first geofence at every first period, but the second warning message may be transmitted to the vehicle located in the second geofence at every second period that is slower than the first period. The first warning message may be transmitted a plurality of times, but the second warning message may be transmitted only once.

In another example, transfer rates and/or transmission delay set in the first and second warning messages may be different. Since the first geofence is an area where there is an accident risk and the second geofence is a buffer area for guiding the first geofence so that a warning message stronger than the second geofence is transmitted to the first geofence.

The processor 130 may variably set the geofence according to a road type such as an intersection or a ramp, a road surface condition, a road situation such as a falling object, an obstacle, and an accident occurrence, a driver's state of a vehicle, and a vehicle type.

Figure 3:
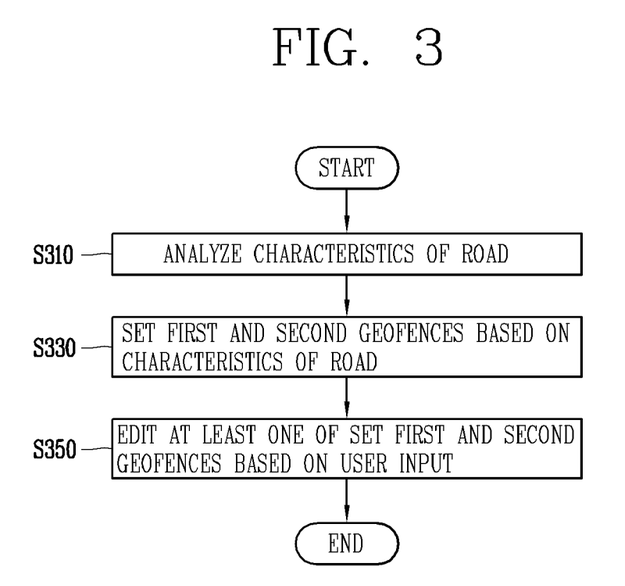
FIG. 3 is a flowchart for explaining a method of setting a geofence based on characteristics of a road.
Figure 4A:
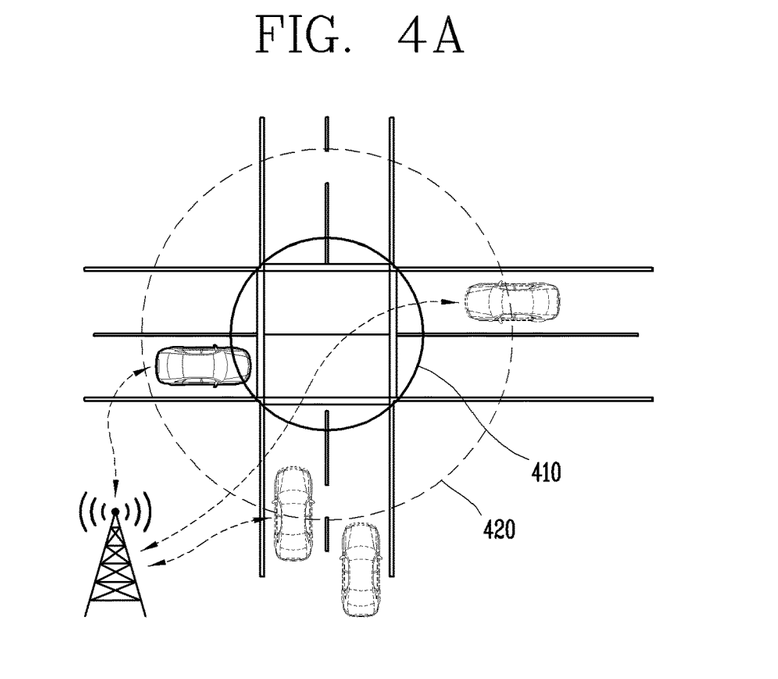
FIGS. 4A and 4B are views for explaining the method of FIG. 3.
Figure 4B:
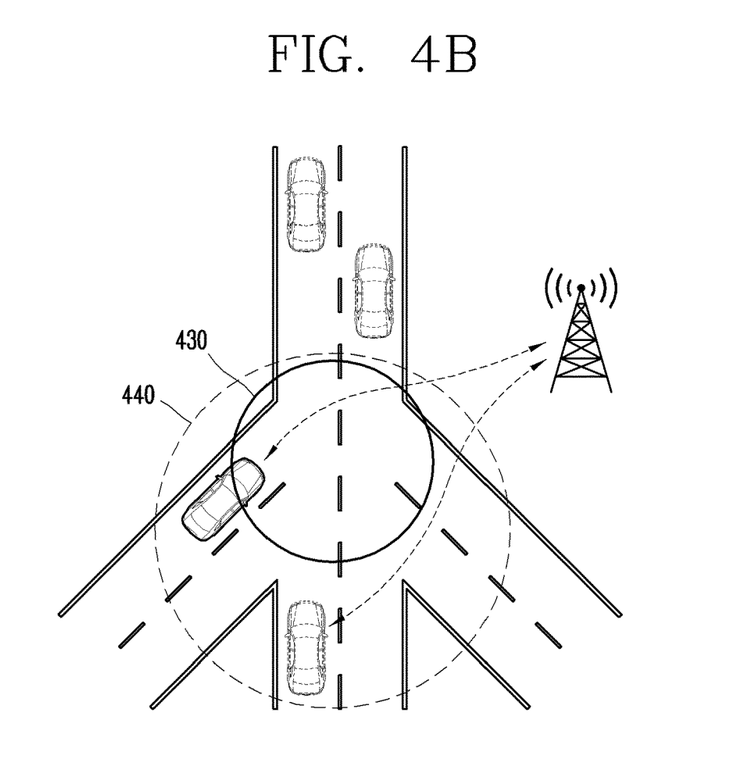

A method of setting the first and second geofences will be described in detail. FIG. 3 is a flowchart for explaining a method of setting a geofence based on characteristics of a road, and FIGS. 4A and 4B are views for explaining the method of FIG. 3.

The processor 130 may analyze characteristics of a road included in a predetermined area using a map stored in a memory or provided through a server or the like (S310).

Here, the characteristics of the road may include a width of the road, a type and grade of the road, a form of the road, the number and type of lanes, and a legal binding force set for each lane.

The processor 130 may search for a predetermined area that needs to set a geofence according to a preset algorithm using the characteristics of the road. A road in which an accident frequently occurs or a road that needs to be provided with a warning about a forward situation to a rear vehicle may be searched as the predetermined area.

Next, the processor 130 may set the first and second geofences based on the characteristics of the road (S330).

For example, the processor 130 may automatically set the first and second geofences according to a predetermined algorithm.

In another example, when the first geofence is set based on a user input, the processor 130 may automatically generate a second geofence based on the first geofence and the characteristics of the road in which the first geofence is set.

At least one of a position, size, and shape of the first and second geofences may be defined in different ways depending on the characteristics of the roads located in the predetermined area.

As shown in FIG. 4A, when two or more roads intersect and form a cross, a first geofence 410 in a circular shape may be set in a region where the roads intersect, and an area outside the edge may be based on the first geofence 410 may be set as the second geofence 420. In other words, the second geofence 420 may include an area located outside a boundary of the first geofence 410.

The width of the second geofence 420 may vary depending on a maximum speed set at the intersection. For example, the second geofence 420 may have a first width at a first maximum speed but may have a second width greater than the first width at a second maximum speed that is faster than the first maximum speed. When the vehicle is located at the same point, a time required for entering the first geofence 410 is reduced as the maximum speed is faster.

As shown in FIG. 4B, when two or more roads are merged into one road, a first geofence 430 in a circular shape may be set in the region where roads are merged. A second geofences 440 may be set in a region before a plurality of roads are merged based on the first geofence 430.

As such, different types of geofences having different sizes may be set according to the characteristics of each road.

The processor 130 may set only the first geofence and not the second geofence.

The second geofence may be variably set according to an attribute of any one vehicle that enters the first geofence or is expected to enter the first geofence. For example, when the first vehicle enters the first geofence, the second geofence of the first type corresponding to the first vehicle may be set to a first size. The first size may vary depending on a speed at which the first vehicle enters the first geofence and/or a size or weight of the first vehicle. As another example, when the second vehicle enters the first geofence, the second geofence of the second type corresponding to the second vehicle may be set to a second size. The second size may also vary depending on a speed of the second vehicle that enters the first geofence and/or a size or weight of the second vehicle.

The second geofence may include a plurality of geofences defined differently depending on the speed of each vehicle located in the predetermined area based on the first geofence. For example, if there is a first vehicle running at the first speed and a second vehicle running at the second speed, the second geofence for the first vehicle and the second geofence for the second vehicle may be set to be different. This is to ensure an adequate safety distance for each vehicle to enter the first geofence.

The processor 130 may edit at least one of the set first and second geofences based on a user input (S350).

The communication device may further include a user input unit. The processor 130 may edit at least one of the first and second geofences based on a user input applied through the user input unit. For example, at least one of the position, shape, and size of the first and second geofences may be changed according to a user input. Because a road manager may edit geofences as needed, geofences optimized for the actual roads may be provided to drivers.

Figure 5:
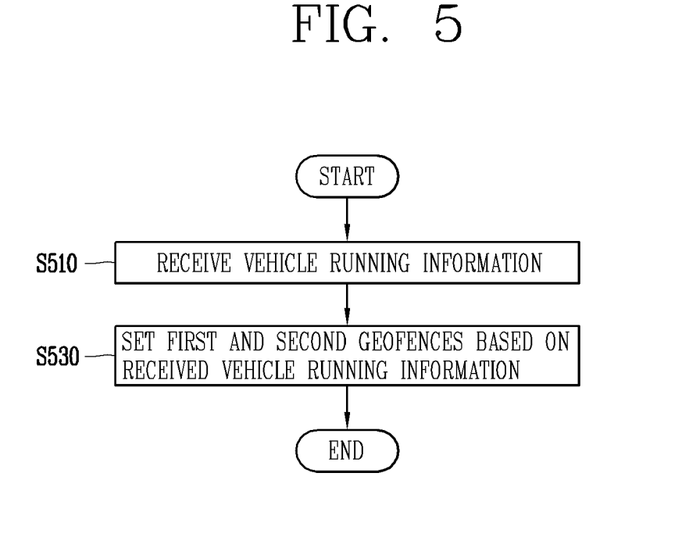
FIG. 5 is a flowchart for explaining a method of setting a geofence based on vehicle running information.
Figure 6A:
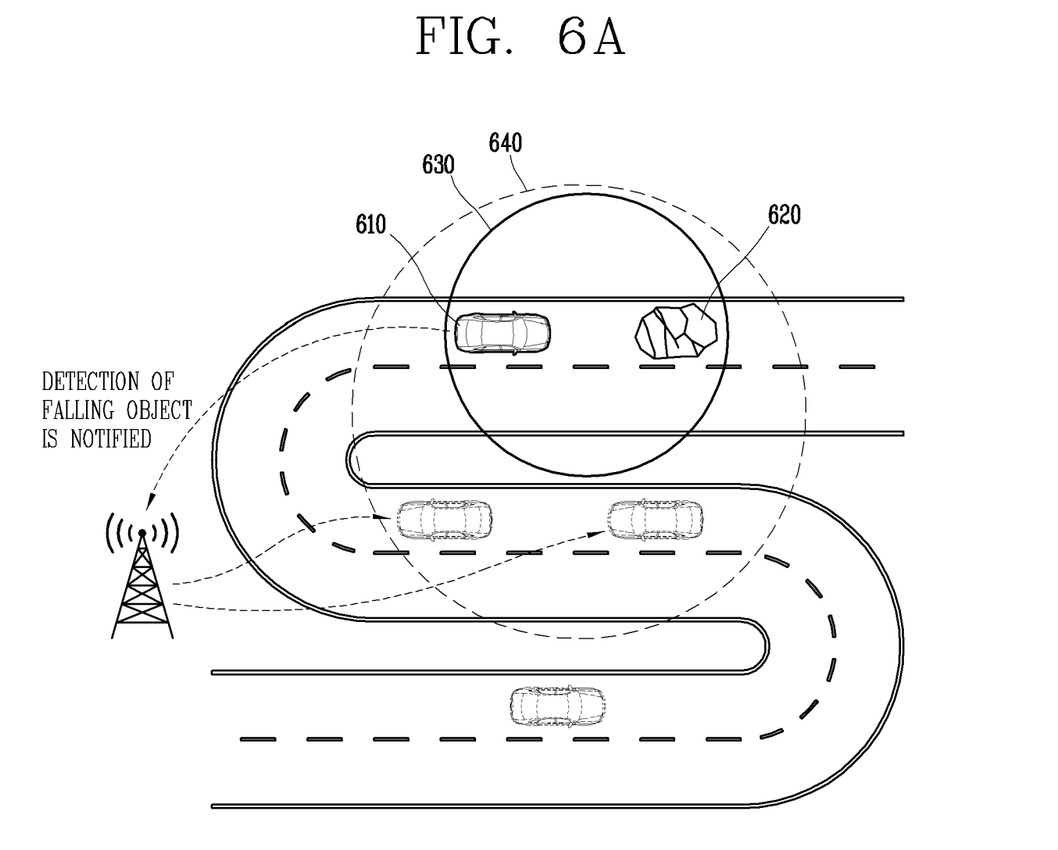
FIGS. 6A, 6B, and 6C are exemplary views for explaining the method of FIG. 5.
Figure 6B:
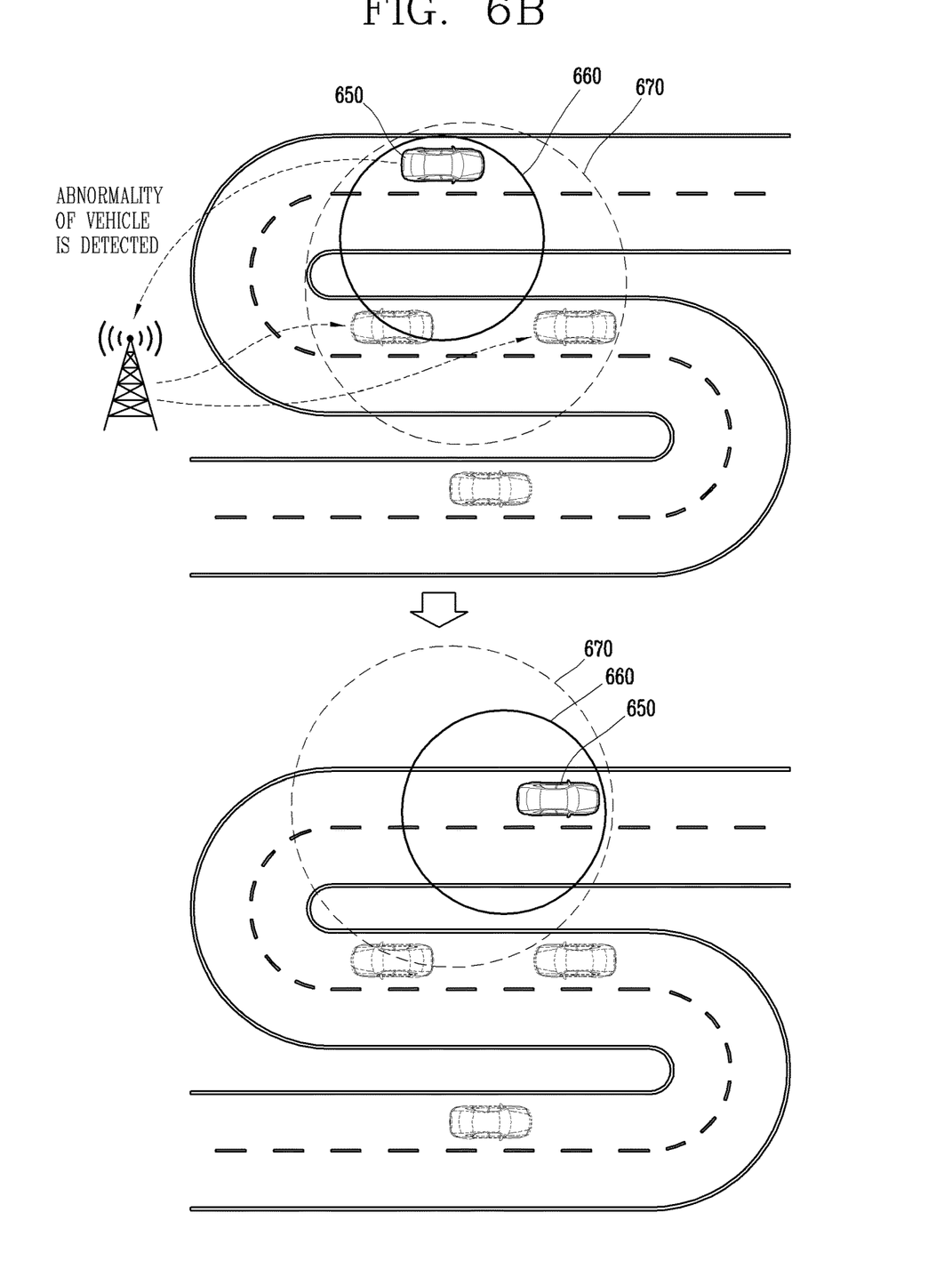
Figure 6C:
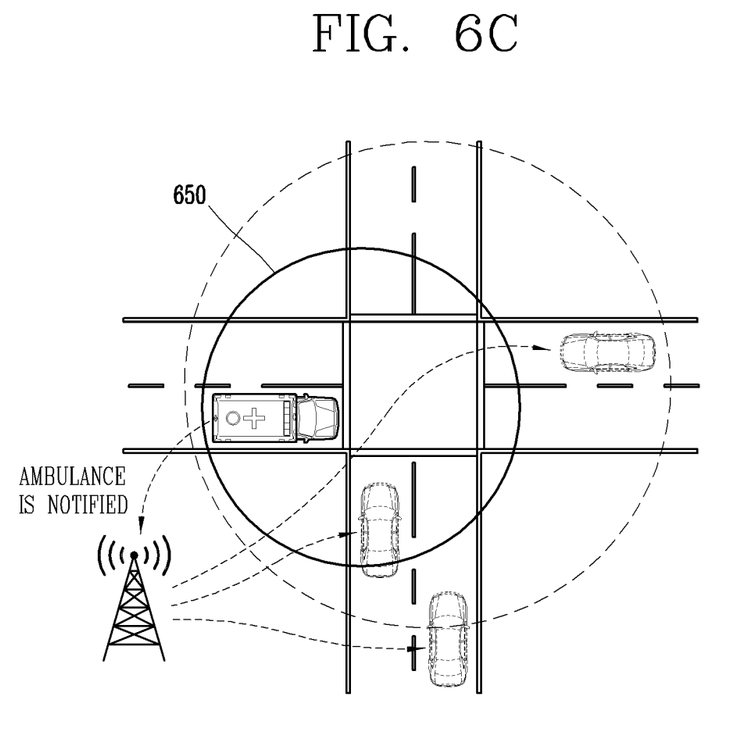

FIG. 5 is a flowchart for explaining a method of setting a geofence based on vehicle running information, and FIGS. 6A, 6B, and 6C are exemplary views for explaining the method of FIG. 5.

The processor 130 may receive vehicle running information generated in each vehicle from each vehicle located in the predetermined area (S510). The vehicle running information corresponds to the information generated by various electronic control units (ECU) provided in the vehicle as described with reference to FIG. 1.

For example, the vehicle running information may be information indicating that the vehicle has been subjected to automatic emergency braking, or may be information indicating that braking of a predetermined magnitude or greater has occurred. In another example, the vehicle running information may be a captured image of an obstacle located on the road. As another example, it may be information informing that the driver of the vehicle is driving while drowsy. In another example, information indicating that an emergency patient is in the vehicle may be included in the vehicle running information.

The processor 130 may determine whether the vehicle running information satisfies a reference condition.

If the vehicle running information satisfies the reference condition, the processor 130 may set at least one of the first and second geofences based on the vehicle running information (S530).

The processor 130 may set at least one of the first and second geofences in response to receiving the vehicle running information satisfying the reference condition from any one of the vehicles located in the predetermined area.

At this time, at least one of the position, the size, and the shape of the first and second geofences may be variably set according to the vehicle information received from the any one of the vehicles.

As shown in FIG. 6A, a certain vehicle 610 may transmit an image of a front side captured using a front camera to the communication device 100 as vehicle running information.

The processor 130 may search for an object that obstructs running of the vehicle from the image. The object may be an obstacle such as a falling object or an accident vehicle, which is located on the road and a running direction of the vehicle must be changed. When the obstacle 620 is searched, the processor 130 may set a first geofence 630 and a second geofence 640 based on the obstacle 620.

The processor 130 may set the first and second geofences in consideration of a type and size of the obstacle. Further, a warning message indicating blockage of a specific lane may be transmitted to the vehicle located in at least one of the first and second geofences so as to prevent the vehicle from running in the specific lane where the obstacle is located.

As shown in FIG. 6B, a vehicle 650 performs a drive status monitoring function and if the driver is operation unavailable state, the vehicle 650 may transmit related information to the communication device 100. Alternatively, when a malfunction occurs in the vehicle or an abnormal situation related to running occurs, related information may be transmitted to the communication device 100.

In this case, the processor 130 may set the vehicle 650 as a reference point of at least one of the first and second geofences. As the vehicle 650 moves, at least one of the first and second geofences 660 and 670 may be varied.

A first warning message including a control command to be taken to avoid the vehicle 650 may be transmitted to the vehicle located in the first geofence. A second warning message including guidance information for guiding the first geofence at which the vehicle 650 is located may be transmitted to a vehicle located at the second geofence.

As shown in FIG. 6C, when a vehicle 680 is a special vehicle such as a police car or an ambulance or when a patient who needs an emergency measure is in the vehicle 680, the first and second geofences based on the certain vehicle 680 as a reference point may be set by the processor 130.

Figure 7:
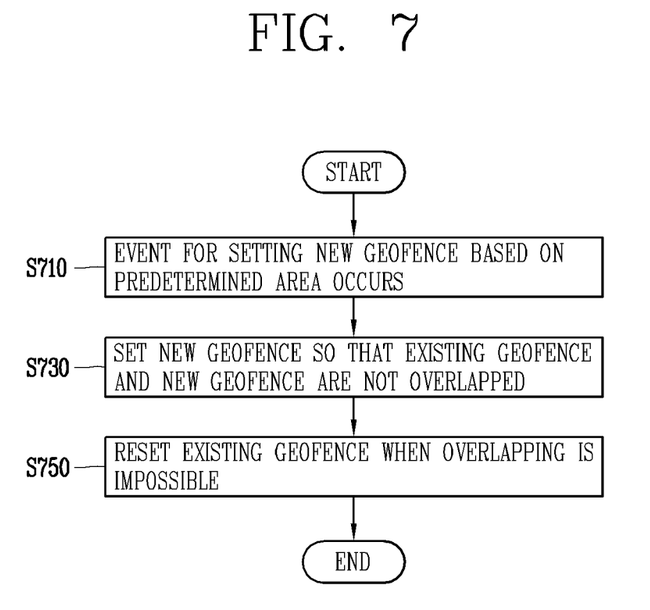
FIG. 7 is a flowchart for explaining a method of setting a new geofence.
Figure 8:
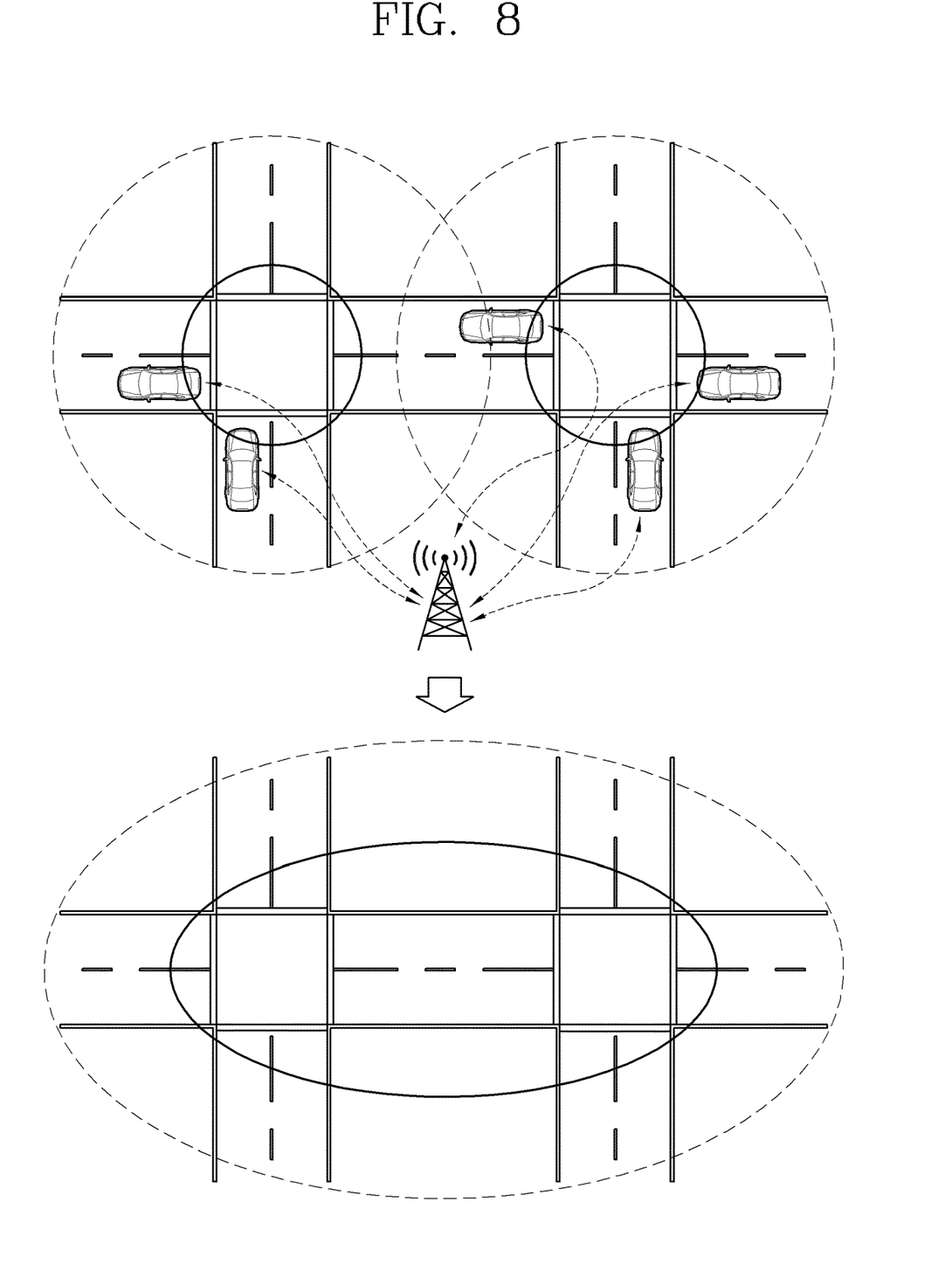
FIG. 8 is an exemplary diagram for explaining the method of FIG. 7.

FIG. 7 is a flowchart for explaining a method of setting a new geofence, and FIG. 8 is an exemplary diagram for explaining the method of FIG. 7.

The processor 130 may detect occurrence of an event that requires setting a new geofence based on the predetermined area (S710).

For example, a new geofence may be set based on the vehicle running information received from a certain vehicle. In another example, a new geofence may be set as a special vehicle such as an ambulance enters the predetermined area. When a portion of a road is flooded according to rain more than a reference, a new geofence may be set.

As shown in FIG. 8, a new intersection may be newly established in the area where the existing geofence is set according to road construction.

The processor 130 may set a new geofence so that the existing geofence and the new geofence do not overlap (S730).

When the geofences overlap, excessive information may be provided by different warning messages and a situation in which inconsistent controlling must be simultaneously performed may occur. Accordingly, the processor 130 sets a new geofence so that the existing geofence and the new geofence are not overlapped.

If it is not possible for the existing geofence and the new geofence not to overlap with each other, the processor 130 may reset the existing geofence (S750). In this case, a new geofence is not created and the existing geofence may be expanded.

As shown in FIG. 8, at least one of the position, size, and shape of the existing geofence may be edited.

A communication system according to the present invention includes the communication device 100 and the vehicle 200 described above with reference to FIGS. 1 to 8.

A plurality of vehicles are positioned in a predetermined area in which the first and second geofences are set, and generate position information indicating their position within the predetermined area.

The communication device 100 searches for the position of each vehicle based on the position information of each vehicle, selects one or more vehicles located in the second geofence in response to an event occurring in the first geofence, and transmits a warning message related to the event to the one or more selected vehicles.

When the event occurs, the communication device 100 may transmit a first warning message to a first vehicle located in the first geofence, and a second warning message to a second vehicle located in the second geofence. At this time, different information may be included in the first warning message and the second warning message.

The second vehicle may automatically adjust at least one of a running speed and a running lane until the second vehicle enters the first geofence in response to the second warning message. That is, autonomous driving may be performed regardless of the driver's intention.

When an abnormality of the driver is detected, the first vehicle among the plurality of vehicles may transmit a vehicle message indicating the abnormality to the communication device, and the communication device 100 may set the first vehicle as a reference point of at least one of the first and second geofences. As the first vehicle moves, at least one of the first and second geofences is varied.

The communication device 100 may set the first and second geofences in response to receiving vehicle information satisfying a reference condition from any one of the vehicles located in the predetermined area. At least one of the position, size and shape of the first and second geofences may be variably set according to the vehicle information received from the any one of the vehicles.

The communication device 100 may set the first geofence and the second geofence based on an image received from the first vehicle. When the second vehicle is located in the second geofence, the communication device 100 may provide the second vehicle with the image received from the first vehicle. The second vehicle may display the image and display information associated with the first geofence on the image. Therefore, the driver of the second vehicle may intuitively recognize the first geofence.

The present invention can be implemented as computer-readable codes (applications or software) in a program-recorded medium. The method of controlling the autonomous vehicle can be realized by a code stored in a memory or the like.

The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the processor or the controller. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

What is claimed is:

1. A communication device comprising:
   a transceiver configured to receive position information of one or more vehicles, wherein the one or more vehicles are located in a predetermined area and include at least one first vehicle and at least one second vehicle; and
   a processor configured to:
      set, in the predetermined area, a first geofence and a second geofence; and
      control, based on an event occurring in the first geofence, the transceiver to transmit a warning message related to the event to the at least one second vehicle determined to be located in the second geofence,
   wherein:
      the event includes the at least one first vehicle entering the first geofence, and
      the processor is configured to, based on the at least one first vehicle entering the first geofence, control the transceiver to transmit, to the at least one second vehicle, the warning message notifying that the at least one first vehicle has entered the first geofence.

2. The communication device of claim 1, wherein at least one of a position, a size, or a shape of the first geofence and the second geofence are defined in different manners based on one or more characteristics of a road located in the predetermined area.

3. The communication device of claim 2, wherein the second geofence includes a subset region of the predetermined area that is located outside of the first geofence.

4. The communication device of claim 1, wherein the processor is configured to variably set the second geofence based on an attribute of the at least one first vehicle that has entered the first geofence.

5. The communication device of claim 1, wherein the processor is configured to set the first geofence and the second geofence based on the received position information of the one or more vehicles satisfying a reference condition.

6. The communication device of claim 5, wherein at least one of a position, a size, or a shape of the first geofence and the second geofence are variably set based on the received position information of the one or more vehicles.

7. The communication device of claim 6, wherein:
   the received position information of the one or more vehicles includes an image photographed by at least one of the one or more vehicles, and
   based on an object that obstructs traveling of at least one of the one or more vehicles being captured in the image, the processor is configured to set the first geofence and the second geofence according to the object.

8. The communication device of claim 6, wherein:
the processor is configured to set a reference vehicle of the one or more vehicles as a reference point for at least one of the first geofence or the second geofence based on the received position information of the one or more vehicles satisfying the reference condition, and
the processor is configured to change settings of at least one of the first geofence or the second geofence based on traveling of the reference vehicle.

9. The communication device of claim 1, wherein:
the processor is configured to control the transceiver to transmit a first warning message to the at least one first vehicle located in the first geofence and to transmit a second warning message to the at least one second vehicle located in the second geofence, and
the first warning message and the second warning message include different information.

10. The communication device of claim 9, wherein:
the first warning message includes a control command that causes the at least one first vehicle to perform a predetermined function, and
the second warning message includes guidance information for updating the first geofence.

11. The communication device of claim 9, wherein the first warning message and the second warning message are transmitted in different manners.

12. The communication device of claim 1, wherein the second geofence includes a plurality of geofences that are variably set based on traveling speed of the one or more vehicles located in the predetermined area.

13. A control method comprising:
receiving, by a transceiver, position information of one or more vehicles, wherein the one or more vehicles are located in a predetermined area and include at least one first vehicle and at least one second vehicle;
setting, by a processor and in the predetermined area, a first geofence and a second geofence; and
controlling, by the processor, based on an event occurring in the first geofence, the transceiver to transmit a warning message related to the event to the at least one second vehicle determined to be located in the second geofence,
wherein:
the event includes the at least one first vehicle entering the first geofence, and
the warning message is a message informing the at least one second vehicle that the at least one first vehicle has entered the first geofence based on the at least one first vehicle entering the first geofence.

14. The control method of claim 13, wherein the setting of the first geofence and the second geofence includes determining at least one of a position, a size or a shape of the first geofence and the second geofence based on the received position information of the one or more vehicles satisfying a reference condition, and
wherein at least one of the position, size or shape of the first geofence and the second geofence are variably set based on the received position information of the one or more vehicles.

15. A communication system comprising:
one or more vehicles located in a predetermined area that includes a first geofence and a second geofence, wherein the one or more vehicles are configured to generate position information in the predetermined area and include at least one first vehicle and at least one second vehicle; and
a communication device that includes a transceiver and that is configured to exchange information with the one or more vehicles via a V2X (Vehicle to everything) communication,
wherein the communication device is configured to:
identify location of each of the one or more vehicles based on the generated position information; and
transmit, based on an occurrence of the at least one first vehicle entering the first geofence, a warning message notifying that the at least one first vehicle has entered the first geofence, to the at least one second vehicle determined to be located in the second geofence.

16. The communication system of claim 15, wherein:
based on the occurrence of the at least one first vehicle entering the first geofence, the communication device is configured to transmit a first warning message to the at least one first vehicle located in the first geofence and to transmit a second warning message to the at least one second vehicle located in the second geofence, and
the first warning message and the second warning message include different information.

17. The communication system of claim 16, wherein the at least one second vehicle is configured to automatically adjust its at least one of a traveling speed or a traveling lane until the at least one second vehicle enters the first geofence in response to the second warning message.

18. The communication system of claim 16, wherein:
based on a detection of abnormal traveling of the first vehicle, the at least one first vehicle is configured to transmit a vehicle information message that indicates the abnormality of traveling of the at least one first vehicle to the communication device,
the communication device, in response to the vehicle information message transmitted from the at least one first vehicle, is configured to set the at least one first vehicle as a reference point for at least one of the first geofence or the second geofence, and
at least one of the first geofence or second geofence is variably set according to the traveling of the first vehicle.

19. The communication system of claim 15, wherein:
the communication device is configured to set the first geofence and the second geofence based on the generated position information of the one or more vehicles satisfying a reference condition, and
at least one of a position, a size, or a shape of the first geofence and the second geofence are variably set based on the position information of the one or more vehicles.

* * * * *